(12) United States Patent
Kornmeyer et al.

(10) Patent No.: US 12,030,779 B2
(45) Date of Patent: Jul. 9, 2024

(54) METHOD FOR PRODUCING CARBON- OR GRAPHITE-FOAM PARTS

(71) Applicant: Nippon Kornmeyer Carbon Group GmbH, Windhagen (DE)

(72) Inventors: Torsten Kornmeyer, Königswinter (DE); David Klein, Hennef (DE); Michael Gerads, Bonn (DE)

(73) Assignee: Nippon Kornmeyer Carbon Group GmbH, Windhagen (DE)

( * ) Notice: Subject to any disclaimer, the term of this patent is extended or adjusted under 35 U.S.C. 154(b) by 0 days.

(21) Appl. No.: 17/732,445

(22) Filed: Apr. 28, 2022

(65) Prior Publication Data
US 2022/0411270 A1  Dec. 29, 2022

(30) Foreign Application Priority Data

Jun. 24, 2021 (DE) .................. 10 2021 116 378.1
Dec. 6, 2021 (DE) .................. 10 2021 132 040.2

(51) Int. Cl.
*C01B 32/205* (2017.01)
*C01B 32/05* (2017.01)
(Continued)

(52) U.S. Cl.
CPC ............ *C01B 32/205* (2017.08); *C01B 32/05* (2017.08); *C01B 32/21* (2017.08); *C08J 9/125* (2013.01);
(Continued)

(58) Field of Classification Search
CPC ..... C01B 32/205; C01B 32/05; C01B 32/382; C01B 32/318
See application file for complete search history.

(56) References Cited

U.S. PATENT DOCUMENTS

| 3,121,050 A | 2/1964 | Ford |
| 3,302,999 A | 2/1967 | Mitchell |

(Continued)

FOREIGN PATENT DOCUMENTS

| CN | 104310373 B | 4/2016 |
| CN | 115367748 A | * 11/2022 |

(Continued)

OTHER PUBLICATIONS

Lei, Hong, and Xiangli Cao. "A novel carbon foam: making carbonaceous "lather" from biomass." Journal of Materials Science 50 (May 12, 2015): 5318-5327. (Year: 2015).*

(Continued)

*Primary Examiner* — Benjamin A Schiffman
(74) *Attorney, Agent, or Firm* — Smartpat PLC (57) ABSTRACT

A method for producing carbon or graphite foam parts with high purity level for high-temperature insulation under vacuum or protective gas, as insulating material or as filter material, includes the following steps: introducing dry, foamable starch (1) into an open-top container (2) having a round or angular cross section, until the base (3) of the container (2) is covered amply and uniformly with starch (1); introducing the container (2) partly filled with starch (1) into an oven (4), and heating the container (2) to a foaming temperature of >180° C. over a prolonged period of several hours to foam the starch (1), until the container (2) has filled completely with carbon foam (6); withdrawing the container (2) from the oven (4) and extracting the carbon foam (6) after sufficient cooling, and optionally portioning the carbon foam (6) into carbon foam parts (6.1).

14 Claims, 6 Drawing Sheets

(51) Int. Cl.

| | | |
|---|---|---|
| *C01B 32/21* | (2017.01) | |
| *C08J 9/12* | (2006.01) | |
| *C08J 9/28* | (2006.01) | |
| *C08J 9/36* | (2006.01) | |

(52) U.S. Cl.
CPC ............... *C08J 9/283* (2013.01); *C08J 9/36* (2013.01); *C01B 2204/24* (2013.01); *C08J 2201/02* (2013.01); *C08J 2303/02* (2013.01)

(56) References Cited

U.S. PATENT DOCUMENTS

| | | | |
|---|---|---|---|
| 3,342,555 A | 9/1967 | Mcmillan | |
| 3,830,740 A | 8/1974 | Amagi et al. | |
| 5,618,510 A | 4/1997 | Okada et al. | |
| 8,790,548 B2 * | 7/2014 | Budarin | B01J 31/10 252/502 |
| 2011/0028708 A1 * | 2/2011 | White | C08L 5/00 536/123.1 |
| 2014/0056798 A1 * | 2/2014 | Fletcher | C01B 32/366 423/445 R |
| 2015/0284252 A1 * | 10/2015 | Karthik | C04B 38/067 264/29.7 |
| 2022/0259049 A1 * | 8/2022 | Wang | C01B 32/384 |

FOREIGN PATENT DOCUMENTS

| | | | | |
|---|---|---|---|---|
| DE | 2231454 B2 | 7/1978 | | |
| DE | 102021132040 A1 * | 12/2022 | ............ | C01B 32/05 |
| DE | 102021130581 A1 * | 5/2023 | | |
| JP | H03187985 A | 8/1991 | | |
| JP | S63209837 B | 8/1994 | | |
| JP | H07277719 B | 5/2000 | | |
| JP | 2004217446 A | 8/2004 | | |
| JP | 2009173540 A | 8/2009 | | |

OTHER PUBLICATIONS

Cao, Jinhui, et al. "Starch-derived hierarchical porous carbon with controlled porosity for high performance supercapacitors." ACS Sustainable Chemistry & Engineering 6.6 (Apr. 24, 2018): 7292-7303. (Year: 2018).*

Fu, Chunfang, et al. "From starch to carbonaceous foam: The effects of structure and conformation of the feedstock." Journal of analytical and applied pyrolysis 149 (May 25, 2020): 104858. (Year: 2020).*

Wang, Tianwei, et al. "A facile controllable preparation of highly porous carbon foam and its application in photocatalysis." Materials Research Bulletin 122 (Nov. 16, 2019): 110697. (Year: 2019).*

Gao, Yunfang, et al. "Facile fabrication of 3D hierarchically porous carbon foam as supercapacitor electrode material." Applied Sciences 8.4 (Apr. 5, 2018): 565. (Year: 2018).*

Lei, Hong, et al. "A simple strategy for converting starch to novel compressible carbonaceous foam: mechanism, enlightenment and potential application." RSC advances 8.57 (Sep. 19, 2018): 32522-32532. (Year: 2018).*

Rutledge, Andrew R., et al. "Carbonized starch microcellular foam-cellulose fiber composite structures." Bio Resources 3.4 (Sep. 5, 2008): 1063-1080. (Year: 2008).*

Liang, Caiyun, Zhenfeng Wang, Lina Wu, Xiaochen Zhang, Huan Wang, and Zhijiang Wang. "Light and strong hierarchical porous SiC foam for efficient electromagnetic interference shielding and thermal insulation at elevated temperatures." ACS Applied Materials & Interfaces 9, No. 35 (2017): 29950-29957.

\* cited by examiner

METHOD FOR PRODUCING CARBON- OR GRAPHITE-FOAM PARTS

CROSS-REFERENCE TO RELATED APPLICATION

This application claims the benefit of German Patent Applications DE 10 2021 116 378.1, filed 2021 Jun. 24, and DE 10 2021 132 040.2, filed 2021 Dec. 6, both of which are incorporated herein by reference.

TECHNICAL FIELD

The disclosure relates to a method for producing carbon or graphite foam parts with high purity level for high-temperature insulation under vacuum or protective gas, as insulating material, or as filter material.

BACKGROUND

It is generally known that a carbon or graphite foam may be produced from synthetic resins, such as phenolic resins or urethane resins, by foaming these resins and heating them (U.S. Pat. Nos. 3,121,050, 3,342,555, 3,302,999). The major disadvantage of a carbon foam of this kind is considered to be the possibility of shrinkage of the resin foam by up to 75% during the heating, because of a low carbonization rate. It is difficult, accordingly, to produce accurately fitting carbon or graphite foam parts. Moreover, phenolic or urethane resins are the result of chemical reactions involving in part toxic or hazardous starting materials, such as formaldehyde.

In order to achieve a reduction at least in shrinkage accompanying heating, graphite or carbon black may be added to the phenolic or urethane resin foam, but this results in a relatively heavy resin foam, owing to the high density of the additives.

In DE 2 231 454 A, therefore, a proposal is made to admix hollow carbon microbeads to the phenolic or urethane resin and to foam the mixture, and then to heat the foam in order to bring about carbonization or graphitization. The result is a reduction in shrinkage and a carbon or graphite foam which has high strength.

The production of a carbon or graphite foam of this kind, however, is very complicated and expensive, and therefore not well suited to industrial application.

SUMMARY

The disclosure is based on the object of producing carbon or graphite foam parts for high-temperature insulation under vacuum or protective gas, or for filter applications, or as insulating material, in aircraft construction or in space travel, inexpensively and with a high accuracy of fit.

The object is achieved in the case of a method for producing carbon or graphite foam parts for high-temperature insulation under vacuum or protective gas, as insulating material or as filter material, by
  introducing dry, foamable starch into an open-top container having a round or angular cross section, until the base of the container is covered amply and uniformly with starch,
  introducing the container partly filled with starch into an oven, and heating the container to a foaming temperature of at least about 170° C. over a prolonged period of several hours to foam the starch, until the container has filled completely with carbon foam,
  withdrawing the container filled with carbon foam from the oven and extracting the carbon foam after sufficient cooling, and
  portioning the carbon foam into carbon foam parts.

The method yields brownish carbon foam parts of sufficient dimensional stability with a very low amount of residual elements, having a typical residual-elements content of <20 ppm.

With this method, which is particularly easy to accomplish, (brownish) carbon foam parts of any desired size can be produced in the form of blocks or slabs. These carbon foam parts are also easy to machine (e.g., by sawing, drilling, etc.). Carbon foam slabs in particular can be particularly easily produced with a high cuboidal and open-top container with a small base area as a mold.

Alternatively of course it is also possible for carbon foam blocks produced with the method to be reshaped or broken up into carbon foam slabs or other structural parts by sawing or other machining methods, such as laser-beam or water-jet cutting.

The starch used for producing the carbon foam parts is preferably corn starch or wheat starch, although tapioca starch, potato starch or other foamable starch, such as rice starch, may also be used, allowing the production of carbon foam parts with different consistencies. The powdered corn starch employed here ought to possess a high purity level—the amount of residual elements (extraneous elements) ought not to exceed ~300 ppm.

During the operation of foaming the starch in the oven, it is also possible for steam to be supplied in order to influence the final structure of the carbon foam parts; the steam can be generated easily by means of a water-filled beaker which is also placed into the oven during the foaming operation.

It is useful to fill the mold up to around 20% with starch in order to prevent foam overtopping the mold.

In a continuation, the starch is foamed over a period of several hours, e.g., more than 8 hours, until the mold has filled completely with foam.

In one embodiment, the foaming temperature may be 200° C. or more, with the duration and the temperature having an effect on the density of the carbon foam parts, with higher temperatures leading to a more foamy condition of the carbon foam.

The starch, such as wheat starch, may also be foamed in stages ascendingly in a temperature range from 170° C. to 200° C., preferably in 10° C. steps, which are each maintained over several hours, such as up to 12 hours in each case. This allows wheat starch in particular to be foamed with particular homogeneity.

In one particular embodiment, the carbon foam parts are carbonized in an aftertreatment in a vacuum oven at a temperature from 1000° C. upward under vacuum.

The carbon foam parts manufactured in this way may be readily graphitized at a temperature from 1700° C. to more than 2400° C. under vacuum.

The thermal treatment of the carbon foam parts for carbonizing or graphitizing takes place preferably under a pressure of >500 mbar, more preferably under atmospheric pressure of around 1013 mbar.

It is advantageous if before the thermal treatment for carbonizing or graphitizing, the carbon foam parts are preheated in the vacuum oven with a flat heating ramp to around 500° C., in order to volatilize volatile constituents ahead of the further thermal treatment. In this way, the formation of cracks in the foam parts may also be avoided.

In the interest of better handling properties, the carbon foam parts may be lined with organic materials, such as paper, baking paper or cloth, or alternatively impregnated superficially with a PVA adhesive.

The brownish carbon foam parts may also be lined with aluminum foil, in which case there is no possibility of further treatment by carbonization or graphitization. Conversely, the carbon foam parts lined with organic materials can be subjected to thermal further processing.

The lined or impregnated foam parts have the advantage that there is little abrasion or hardly any when they are handled.

One particular continuation sees the graphitized carbon foam parts being readily converted into SiC foam parts in an oven at a temperature of >1200° C. with supply of SiO with argon as carrier gas under a pressure of 30 mbar to 950 mbar. The conversion temperature preferred for this operation is 1520° C. or higher up to around 1600° C.

The carbon, graphite or SiC foam parts produced in such a way are particularly suitable as insulation for buildings, in aircraft construction or in space travel, and the carbon foam parts may also be used very effectively as high-temperature insulation under vacuum or protective gas.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

Each of FIGS. 2-6 contain two images, these being one image which corresponds largely to the original, and a further image with significant accentuation of the structure.

DETAILED DESCRIPTION

Figure 1:
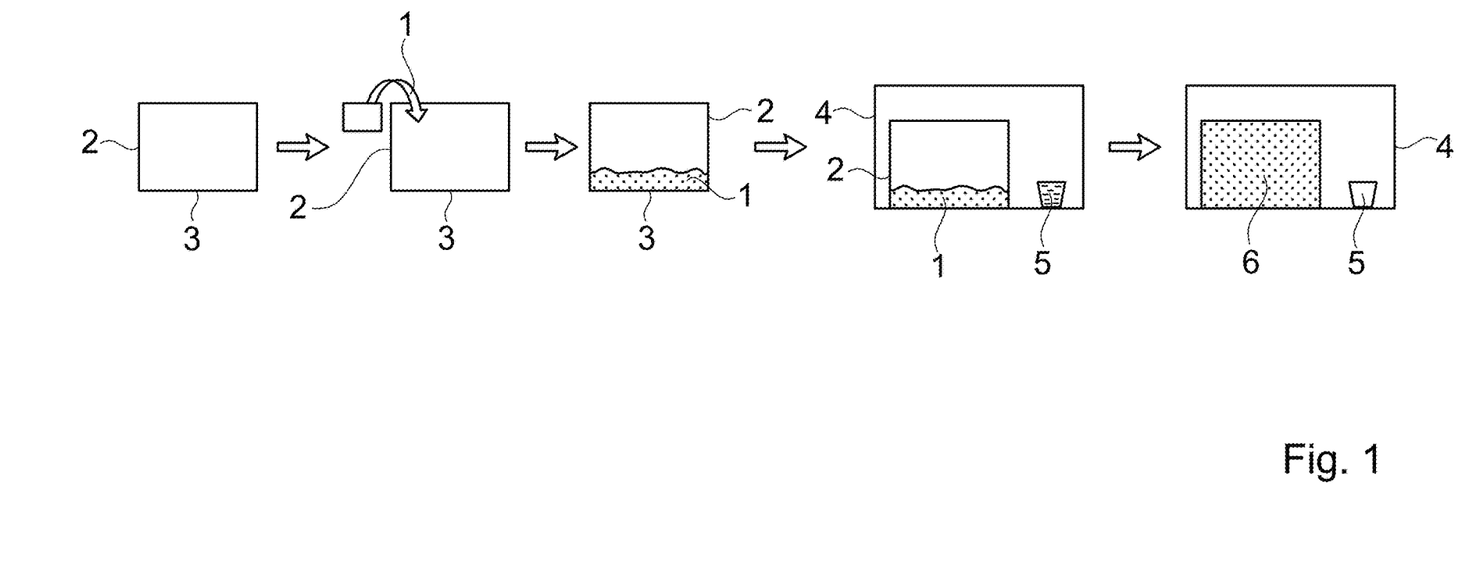
FIG. 1 shows details of the method sequence for producing high-purity graphite foam.

The production of carbon or graphite foam parts with high purity level for high-temperature insulation under vacuum or protective gas, as insulating material or as filter material, is accomplished simply by introducing dry, foamable starch 1 into an open-top container 2 (mold) having a round or angular cross section, until the base 3 of the container 2 is covered uniformly with starch 1. The base is preferably uniformly covered with starch 1 until the container is about 20% (between 10% and 30%) filled with starch 1. The starch used for producing the carbon foam parts is preferably corn starch or wheat starch, although tapioca starch, potato starch or other foamable starch-based materials, such as rice starch, may also be used. FIG. 1 shows details of the method sequence for producing carbon foam 6 with a high purity level.

The container 2 partly filled with starch 1 is subsequently introduced into an oven 4, in which it is brought, by heating of the container 2, to a foaming temperature of >180° C., which is maintained over a prolonged period of several hours for foaming of the starch, until the container 2 has filled completely with carbon foam 6.

During the operation of foaming the starch 1 in the oven 4, it is also possible to supply steam in order to obtain a more uniform final structure of the carbon foam 6 or of the carbon foam parts 6.1 produced from it, in which case the steam can be easily generated by a water-filled beaker 5 which is also placed into the oven 4 during the foaming operation.

The duration of this foaming operation is dependent in particular on the size of the container 2 to be filled with carbon foam 6, and may last for several hours, optionally up to 8 hours.

The foaming of the starch, such as wheat starch, may also be performed in stages ascendingly in a temperature range from 170° C. to 200° C., preferably in 10° C. steps, which are held in each case over several hours, such as up to 12 h in each case. This allows wheat starch in particular to be foamed with particular uniformity.

Figure 4:
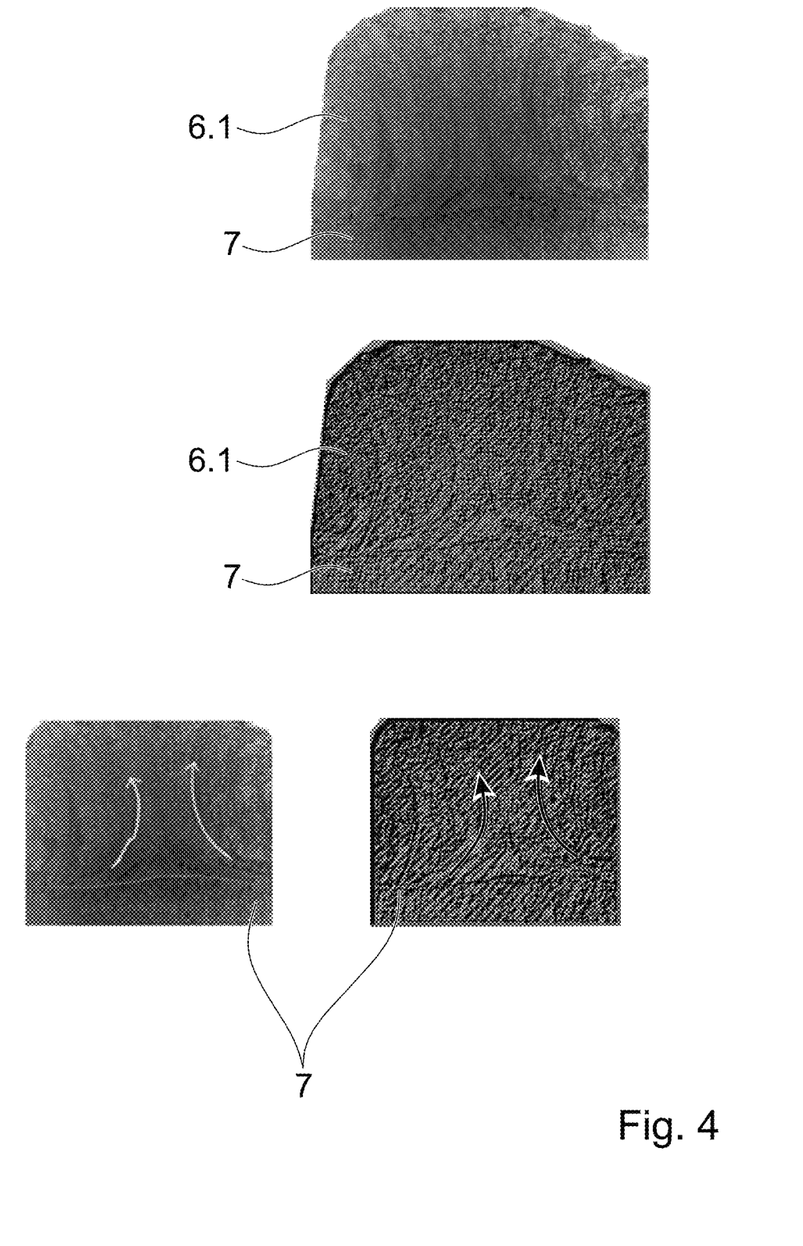
FIG. 4 shows a graphite foam slab having a darker structure at the bottom, which is the region in which the starch was present at the beginning, and a structure located above this, in the region of the foaming; the small image on the right shows the basic structure and also the foaming region (arrows)

FIG. 4 shows vividly the progress of the foaming operation (cf. the upward-pointing arrows which symbolize the foaming region), with the starch 1 originally introduced into the container 2 being visible as basic structure 7 in the bottom region of the carbon foam 6.

Figure 2:
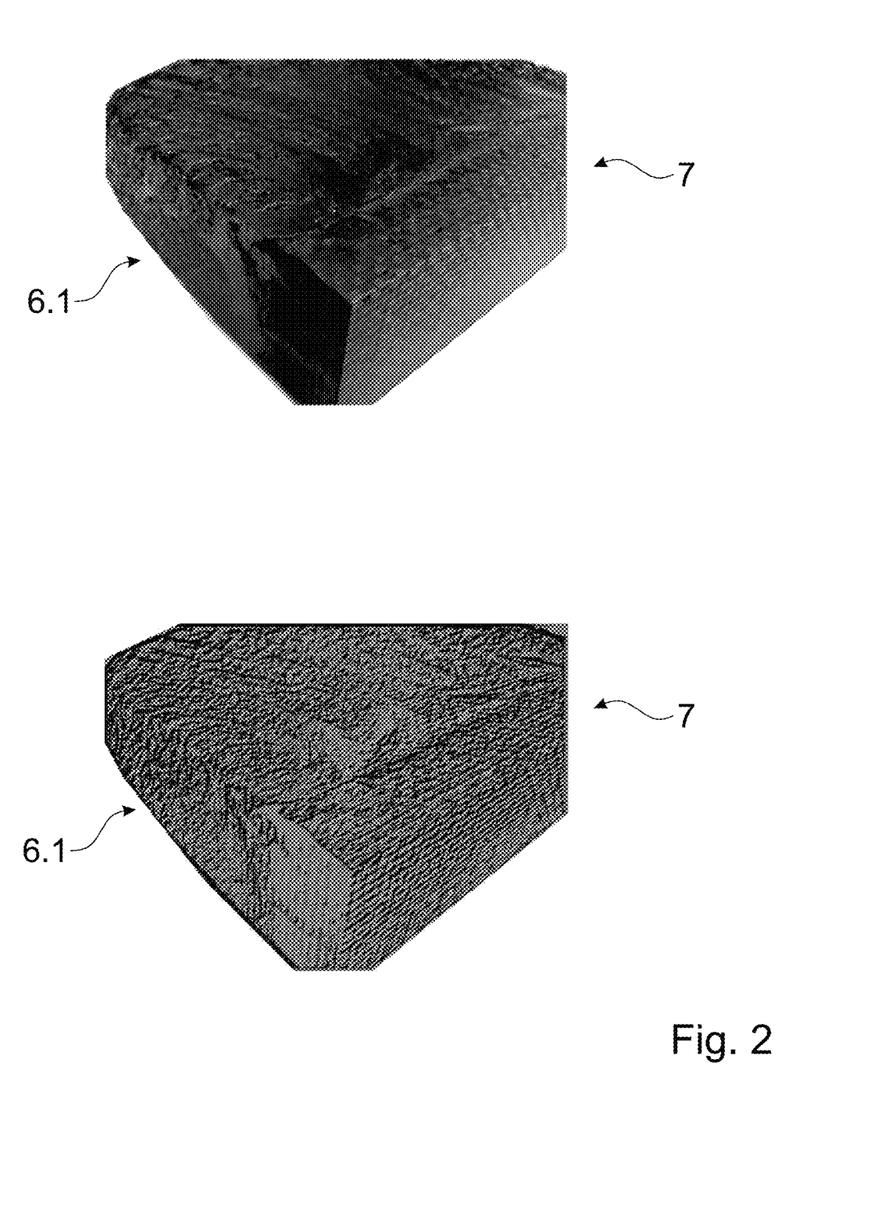
FIG. 2 shows a carbon foam slab produced in a mold and having dimensions for example of 7×35×20 cm.
Figure 3:
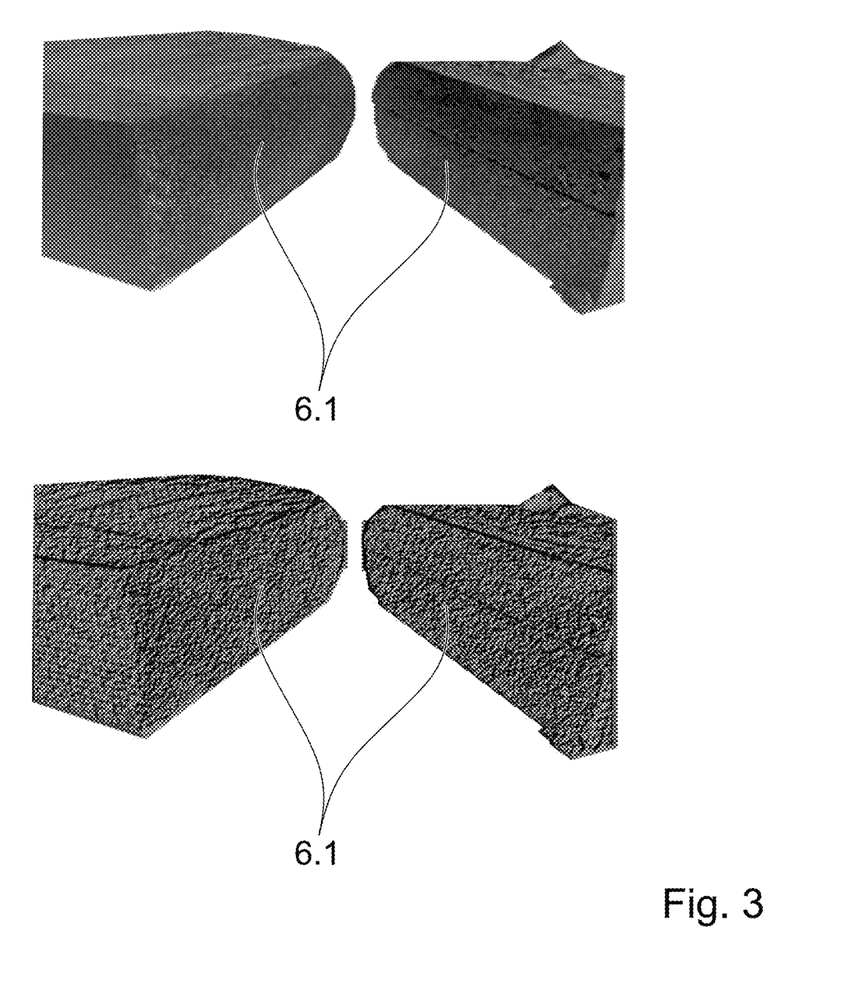
FIG. 3 shows the structure of a sawn graphite foam slab.

After sufficient cooling, the container 2 filled with carbon foam 6 can be withdrawn from the oven 4, and the brownish carbon foam part 6.1 can be taken out of the container 2 (FIG. 2). The carbon foam part 6.1 removed may be subsequently reshaped into any desired structural parts by means of suitable cutting methods, such as sawing, water-jet cutting or laser-beam cutting (FIG. 3).

Figure 5:
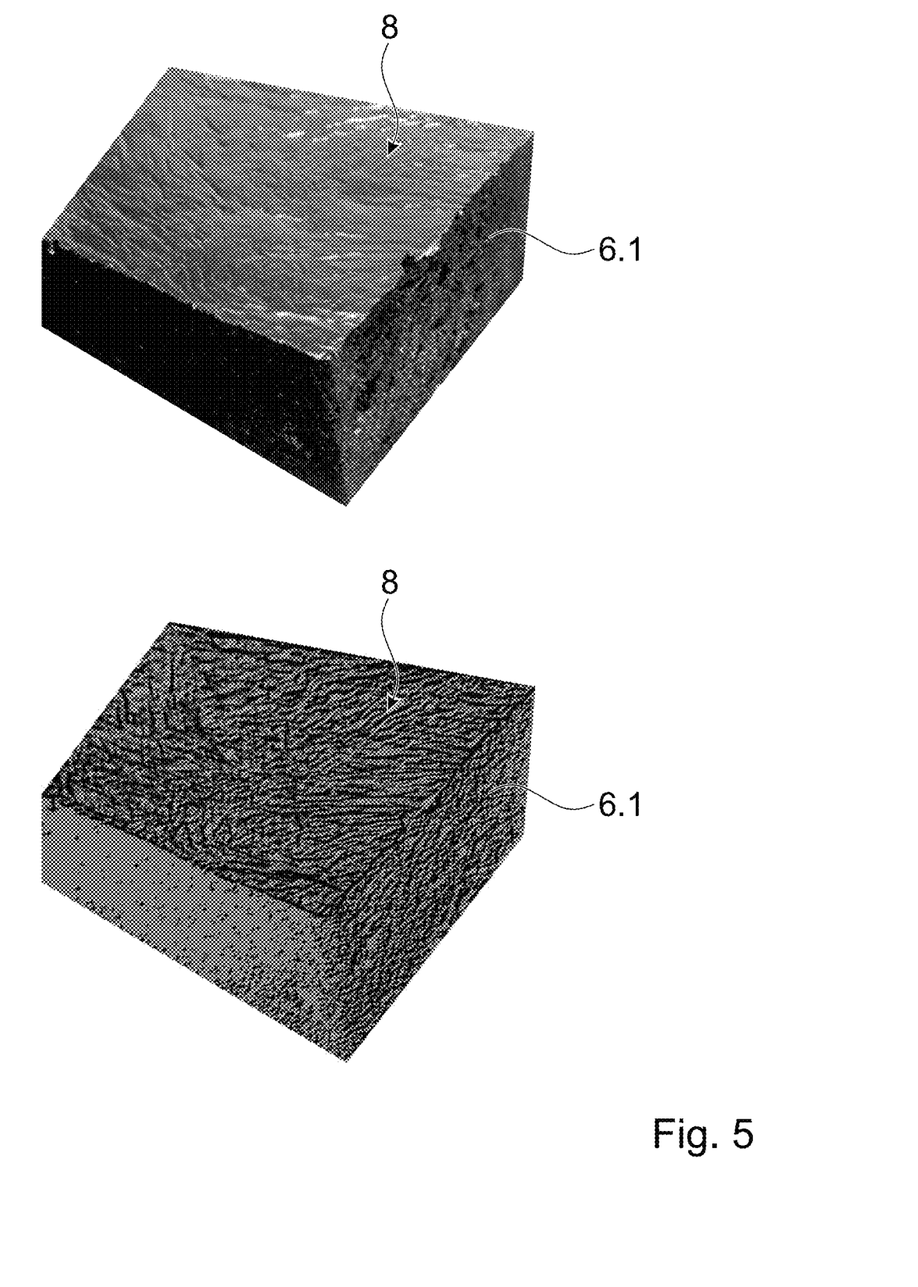
FIG. 5 shows a graphite foam slab lined for example with an aluminum foil.

In the interest of better handling properties, the carbon foam parts 6.1 may be lined with an organic coating 8, such as paper, baking paper, or plastic or cloth, or alternatively may be impregnated superficially with a PVA adhesive (FIG. 5).

The coating 8 of the brownish carbon foam parts 6.1 with aluminum foil is also possible, although it rules out thermal further processing, such as graphitizing, as the aluminum would melt at the temperatures required for such processing.

The particular advantage of the lined or impregnated carbon foam parts 6.1 is considered to be the fact that their handling produces little abrasion or hardly any, and so the carbon foam parts 6.1 have substantially better handling qualities.

Coating with aluminum foil may be accomplished with particular simplicity by first lining the container 2, before the partial filling with starch 1, with aluminum foil; when the starch 1 is foamed, there is at the same time a superficial connection formed to the aluminum foil. A further advantage is considered to be the fact that the foamed carbon foam part 6.1 coated with aluminum foil can be withdrawn more easily from the container 2, since the aluminum foil, while it adheres to the carbon foam part 6.1, does not adhere to the container 2.

Figure 6:
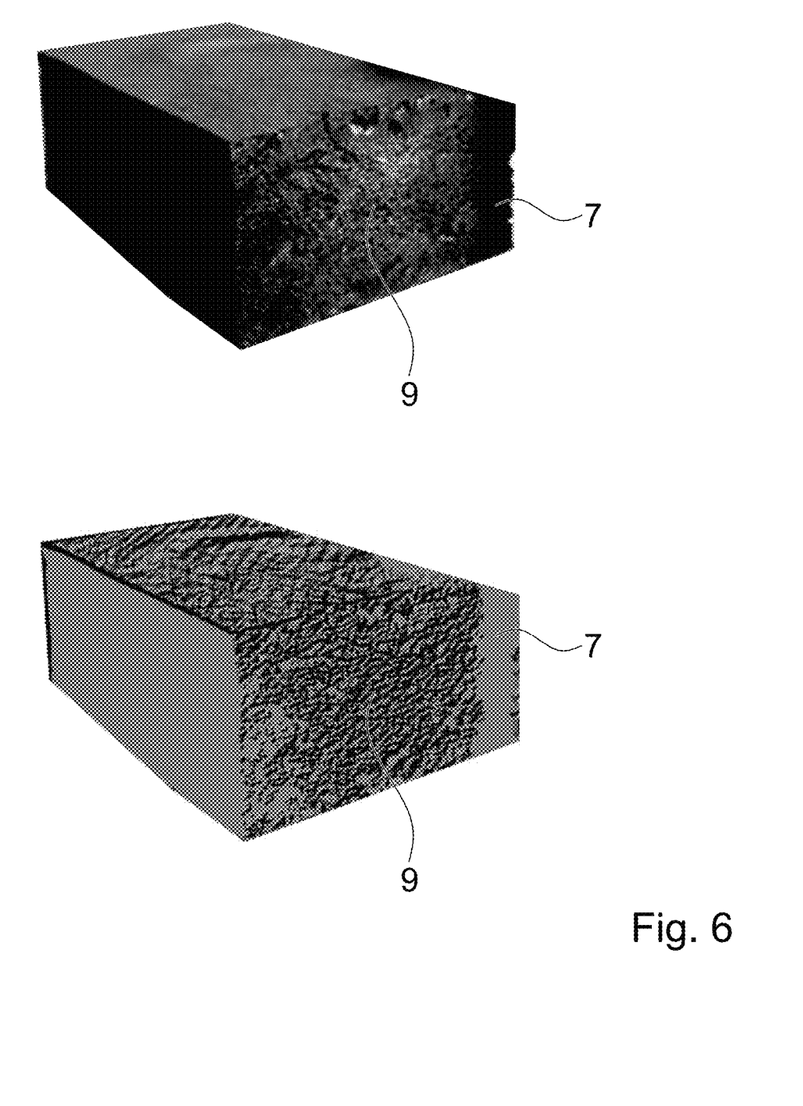
FIG. 6 shows a graphitelike foam after a high-temperature treatment at >2000° C.

The carbon foam part 6.1 need not be stabilized into graphite foam 9, although it can be. In that case the graphitization should not take place under too high a vacuum, since the carbon foam part 6.1 could otherwise burst; at the same time, a slow heating ramp up to the attainment of the graphitization temperature is an advantage. FIG. 6 shows a graphite foam part 9 after a high-temperature treatment at >2000° C. under vacuum.

Cracks or fractures may be formed in the carbon foam part 6.1 during graphitization if gas diffuses out of the material, with the gases diffusing out more rapidly under vacuum. At any rate, the risk of the formation of cracks or fractures under vacuum is greater than under a higher pressure.

For this reason, the graphitization takes place under a pressure of >500 mbar, such as at 750 mbar, for example, at which the structure is stable; a higher pressure, such as atmospheric pressure at 1013 mbar, may also be advantageous, taking place at a temperature from 1000° C. upward (carbonization) and at a temperature of 1700° C. to more than 2400° C. (graphitization).

The graphite foam slabs 9 produced in this way may likewise be lined with various coatings 8, such as aluminum foil or paper, baking paper, cloth, polymeric film, or else impregnated with a PVA adhesive (wood glue).

The carbon foam parts 6.1 or the carbonized carbon foam parts or the graphite foam parts 9 produced by the method described are suitable for a series of applications.

Hence the carbon foam parts 6.1 or the graphite foam parts 9 produced in the form of slabs are highly suitable for use as insulation for buildings or the like.

When the mold used for producing the carbon foam parts 6.1 is lined with aluminum foil and subsequently the carbon foam 6 is produced therein, the aluminum foil sticks firmly to the foam.

After the carbonization, the carbon foam parts 6.1 may be used as high-temperature insulation under vacuum or protective atmosphere.

After the carbon foam part 6.1 has been graphitized, it can also be converted effectively into a silicon carbide foam part, which may be used after conversion into SiC at temperatures of up to about 1500° C. in an oxidizing atmosphere.

The conversion into SiC takes place in an oven 4 at a temperature of >1200° C. with supply of gaseous SiO with argon as carrier gas under a pressure of 30 mbar to form SiC. The temperature preferred for this operation is 1520° C.

The graphite foam parts 9 may also be converted into SiC foam parts under a high pressure, such as 950 mbar. The pressure currently utilized has an influence on the homogeneity and the rate of the conversion.

The advantages of the SiC foam parts are considered to be the fact that they can be produced simply and inexpensively from the graphite foam part 9, that they possess good insulation values as insulation material, and that they can be easily worked.

The particular advantage of graphite foam parts 9 or SiC foam parts is considered to be the fact that they are refractory and that organic raw materials are used for producing the SiC foam parts.

A disadvantage of the SiC foam parts is considered to be the fact that they crumble easily, although this disadvantage may be alleviated by a suitable coating as described.

The silicon carbide (SiC) foam parts have a diversity of possible uses: as insulating material for buildings, as insulation for high-temperature installations up to around 2500° C. under vacuum/inert gas and up to 1500° C. under oxidative atmosphere, while graphite foam can be used under vacuum/inert gas (argon) up to around 3000° C.

Furthermore, the silicon carbide foam parts are particularly suitable for use as insulating material for aerospace on account of the low weight.

Graphite foam parts 9 are also highly suitable as filters, owing to the high porosity.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE NUMERALS

1 Starch
2 Container (mold)
3 Base
4 Oven
5 Beaker
6 Carbon foam
6.1 Carbon foam part
7 Basic structure
8 Coating
9 Graphite foam part

What is claimed is:

1. A method for producing carbon or graphite foam parts, comprising:
   introducing dry, foamable starch (1) into an open-top container (2) having a base (3) with a round or angular cross section, until the base (3) of the container (2) is covered uniformly and the container is filled with starch (1) for more than 10% and no more than 30%;
   introducing the container (2) partly filled with starch (1) into an oven (4);
   heating the container (2) to a foaming temperature of >180° C. to foam the starch (1) until the container (2) has filled completely with carbon foam (6);
   withdrawing the container (2) from the oven (4);
   extracting the carbon foam (6) after cooling, and
   portioning the carbon foam (6) into carbon foam parts (6.1).

2. The method as claimed in claim 1, wherein the starch (1) is corn starch, tapioca starch, wheat starch, rice starch or potato starch.

3. The method as claimed in claim 1, further comprising: supplying steam to the starch (1) in the oven (4) during foaming operation.

4. The method as claimed in claim 1, wherein the starch (1) is foamed over a period of more than 8 hours.

5. The method as claimed in claim 1, wherein the foaming temperature for the starch (1) is 200° C. or more.

6. The method as claimed in claim 1, wherein the foaming is carried out at
   a temperature between 165° C. and 175° C. for a more than 2 and less than 12 hours, followed by
   a temperature between 175° C. and 185° C. for a more than 2 and less than 12 hours, followed by
   a temperature between 185° C. and 195° C. for a more than 2 and less than 12 hours, followed by
   a temperature between 195° C. and 205° C. for a more than 2 and less than 12 hours.

7. The method as claimed in claim 1, further comprising: lining the carbon foam parts (6.1) with one of aluminum foil, paper, baking paper, and cloth.

8. The method as claimed in claim 1, further comprising: impregnating the carbon foam parts (6.1) with a PVA adhesive.

9. A method for producing carbon or graphite foam parts, comprising:
   introducing dry, foamable starch (1) into an open-top container (2) having a base (3) with a round or angular cross section, until the base (3) of the container (2) is covered uniformly and the container is filled with starch (1) for more than 10%;

introducing the container (2) partly filled with starch (1) into an oven (4);

heating the container (2) to a foaming temperature of >180° C. to foam the starch (1) until the container (2) has filled completely with carbon foam (6);

withdrawing the container (2) from the oven (4);

extracting the carbon foam (6) after cooling, portioning the carbon foam (6) into carbon foam parts (6.1); and carbonizing the carbon foam parts (6.1) at a temperature above 1000° C. under vacuum.

10. A method for producing carbon or graphite foam parts, comprising:

introducing dry, foamable starch (1) into an open-top container (2) having a base (3) with a round or angular cross section, until the base (3) of the container (2) is covered uniformly and the container is filled with starch (1) for more than 10%;

introducing the container (2) partly filled with starch (1) into an oven (4);

heating the container (2) to a foaming temperature of >180° C. to foam the starch (1) until the container (2) has filled completely with carbon foam (6);

withdrawing the container (2) from the oven (4);

extracting the carbon foam (6) after cooling, portioning the carbon foam (6) into carbon foam parts (6.1); and graphitizing the carbon foam parts (6.1) at a temperature above 1700° C.

11. The method as claimed in claim 10, wherein the thermal treatment of the carbon foam parts (6.1) for graphitizing takes place under a pressure of >500 mbar.

12. The method as claimed in claim 11, further comprising:

preheating the carbon foam parts (6.1) with a flat heating ramp in a vacuum oven to no more than 500° C. to volatilize volatile constituents ahead of the thermal treatment.

13. The method as claimed in claim 10, further comprising:

converting the graphitized carbon foam parts (6.1) into SiC in an oven (4) at a conversion temperature of >1200° ° C. with supply of SiO with argon as carrier gas under a pressure between 30 mbar and 950 mbar.

14. The method as claimed in claim 13, wherein the conversion temperature is no more than 1600° C.

* * * * *